(12) United States Patent
Watabe et al.

(10) Patent No.: US 8,630,157 B2
(45) Date of Patent: Jan. 14, 2014

(54) DATA REPRODUCING APPARATUS

(75) Inventors: Kazuo Watabe, Yokohama (JP); Akihito Ogawa, Fujisawa (JP); Hideaki Okano, Yokohama (JP); Takashi Usui, Saitama (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 0 days.

(21) Appl. No.: 13/071,592

(22) Filed: Mar. 25, 2011

(65) Prior Publication Data

US 2012/0051201 A1 Mar. 1, 2012

(30) Foreign Application Priority Data

Aug. 30, 2010 (JP) ................................. 2010-192600

(51) Int. Cl.
- *G11B 27/22* (2006.01)
- *G11B 5/09* (2006.01)
- *G11B 5/584* (2006.01)
- *G11C 15/00* (2006.01)

(52) U.S. Cl.
USPC ...................... 369/103; 369/112.1; 369/47.54; 369/30.1; 369/47.47; 359/3; 359/11; 359/32

(58) Field of Classification Search
USPC ............... 369/103, 112.01; 359/3, 11, 30, 35, 359/112.1, 112.15
See application file for complete search history.

(56) References Cited

U.S. PATENT DOCUMENTS

| | | | |
|---|---|---|---|
| 5,412,592 A * | 5/1995 | Krishnamoorthy et al. | 365/49.17 |
| 5,636,334 A * | 6/1997 | Hidaka | 345/419 |
| 8,437,236 B2 * | 5/2013 | Tatsuta et al. | 369/103 |
| 2003/0053403 A1 * | 3/2003 | Miyamoto et al. | 369/275.3 |
| 2006/0126141 A1 * | 6/2006 | Hirao et al. | 359/3 |
| 2006/0126207 A1 * | 6/2006 | Johnson et al. | 360/48 |
| 2009/0080315 A1 * | 3/2009 | Kanamaru et al. | 369/103 |
| 2010/0054103 A1 * | 3/2010 | Tatsuta et al. | 369/103 |

FOREIGN PATENT DOCUMENTS

| | | |
|---|---|---|
| JP | 7-192343 | 7/1995 |
| JP | 2006-177995 A | 7/2006 |
| JP | 2007-335056 A | 12/2007 |
| JP | 2010-061750 A | 3/2010 |
| WO | 2007-114011 A1 | 10/2007 |

OTHER PUBLICATIONS

Japanese Office Action dated Jun. 26, 2012 from corresponding JP Appln. No. 2010-192600.

* cited by examiner

*Primary Examiner* — Wayne Young
*Assistant Examiner* — Dionne Pendleton
(74) *Attorney, Agent, or Firm* — Ohlandt, Greeley, Ruggiero, Perle, L.L.P.

(57) ABSTRACT

According to one embodiment, a data reproducing apparatus includes a data recording medium, light source unit, light application unit, photodetector unit and control unit. An address mark string including address marks is formed on the data recording medium. The address marks are spaced from each other by a distance depending on address data. The light application unit is configured to split the light beam into a first branch light beam and a second branch light beam and apply the first and second branch light beams to the address mark string at different angles. The photodetector unit is configured to detect first reflected light beams and second reflected light beams from the address mark string to generate image data. The first and second reflected light beams result from the first and second branch light beams, respectively. The control unit is configured to reproduce address data based on the image data.

4 Claims, 6 Drawing Sheets

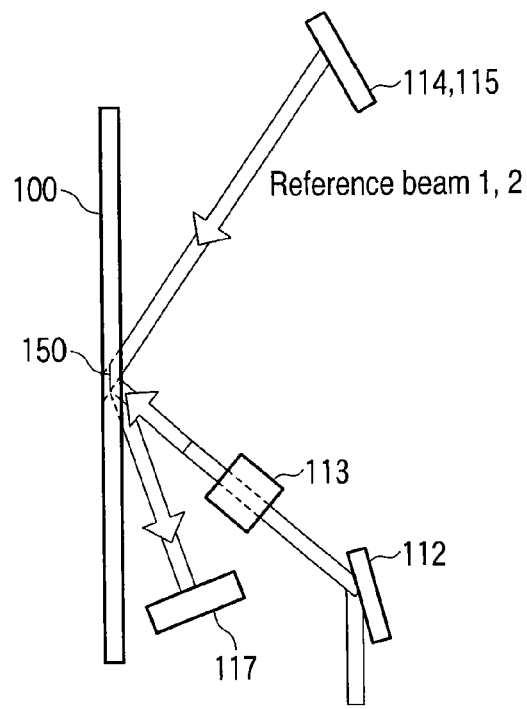
F I G. 2
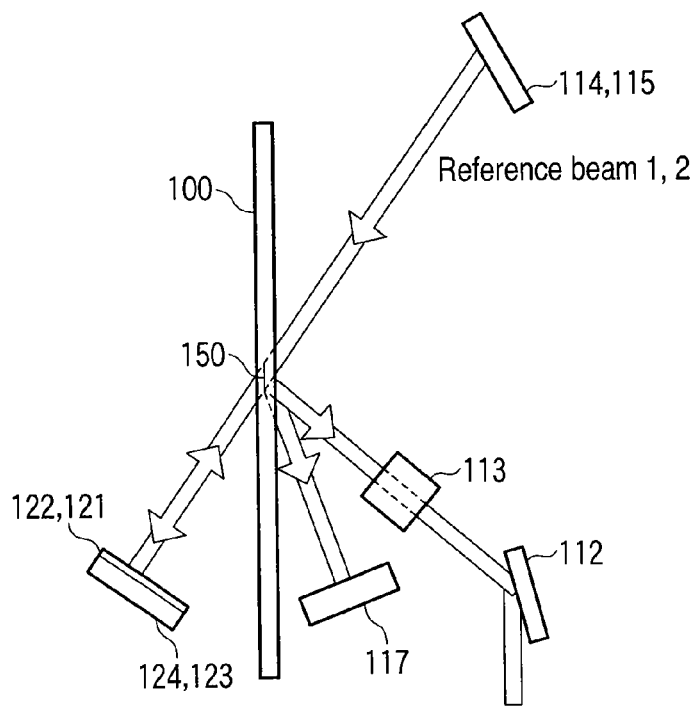
F I G. 4

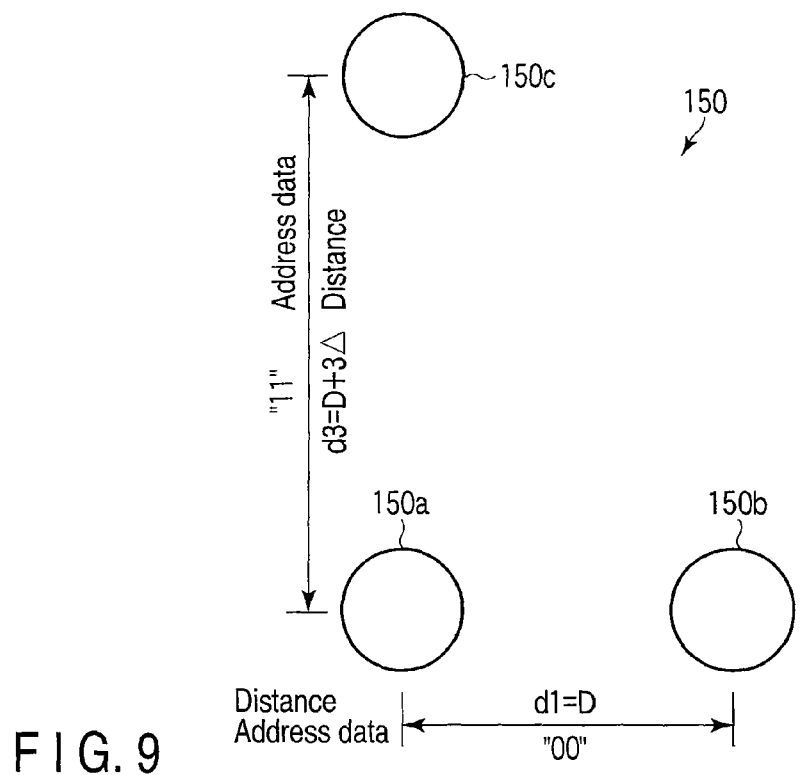
F I G. 9
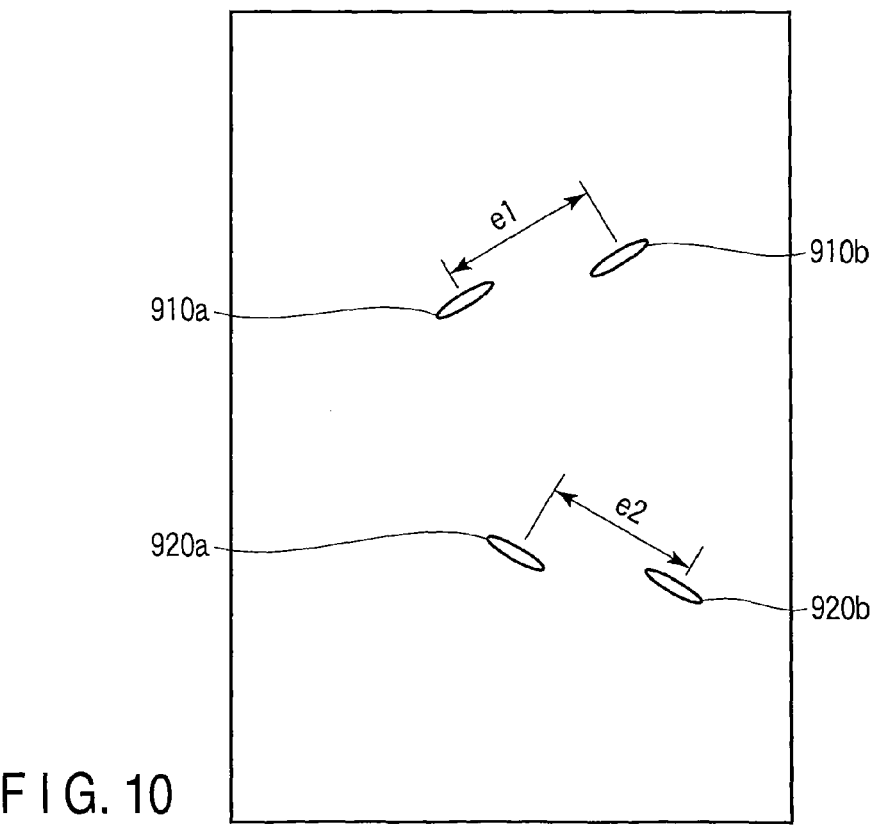
F I G. 10

DATA REPRODUCING APPARATUS

CROSS-REFERENCE TO RELATED APPLICATIONS

This application is based upon and claims the benefit of priority from Japanese Patent Application No. 2010-192600, filed Aug. 30, 2010; the entire contents of which are incorporated herein by reference.

FIELD

Embodiments described herein relate generally to an apparatus for reproducing the address data recorded on a data recording medium.

BACKGROUND

Known as a data recording/reproducing apparatus able to record a great amount of data is a holographic recording/reproducing apparatus, for example. The holographic recording/reproducing apparatus includes a holographic storage medium used as data recording medium. On the inside of the holographic storage medium, a signal beam superimposed with data to be recorded interferes with a reference beam, thereby forming interference fringes. The interference fringes (hologram) are recorded, as data, on the holographic storage medium.

In such a data recording/reproducing apparatus, the address data recorded on the data recording medium is reproduced when data is recorded or reproduced on or from the recording medium. The light-beam applying position is controlled in accordance with the address data so that the light beams may be applied at the target position on the data recording medium.

Therefore, it is necessary to reproduce, at high accuracy, the address data recorded on the data recording medium to control the light-beam irradiating position.

BRIEF DESCRIPTION OF THE DRAWINGS

FIG. 2 is a diagram schematically showing the paths of light beams with respect to a data recording medium shown in FIG. 1;

FIG. 4 is a diagram schematically showing the paths of light beams with respect to a data recording medium shown in FIG. 3;

FIG. 9 is a diagram showing a further example that address data allocated to the address mark string shown in FIG. 5; and FIG. 10 is a diagram schematically showing the address mark images acquired by the photodetector shown in FIG. 5.

DETAILED DESCRIPTION

In general, according to one embodiment, a data reproducing apparatus includes a data recording medium, a light source unit, a light application unit, a photodetector unit and a control unit. On the data recording medium, an address mark string including address marks is formed. The address marks are spaced from each other by a distance depending on address data indicating an absolute position on the data recording medium. The light source unit is configured to generate a light beam. The light application unit is configured to split the light beam into a first branch light beam and a second branch light beam and apply the first branch light beam and the second branch light beam to the address mark string at different angles. The photodetector unit is configured to detect a plurality of first reflected light beams and a plurality of second reflected light beams from the address mark string to generate image data. The first reflected light beams and the second reflected light beams result from the first branch light beam and the second branch light beam, respectively. The control unit is configured to reproduce address data based on the image data.

Hereinafter, a data reproducing apparatus according to one embodiment will be described with reference to the accompanying drawings. In the embodiment, described is an example that the data reproducing apparatus is a holographic recording/reproducing apparatus including a holographic storage medium used as data recording medium.

Figure 1:
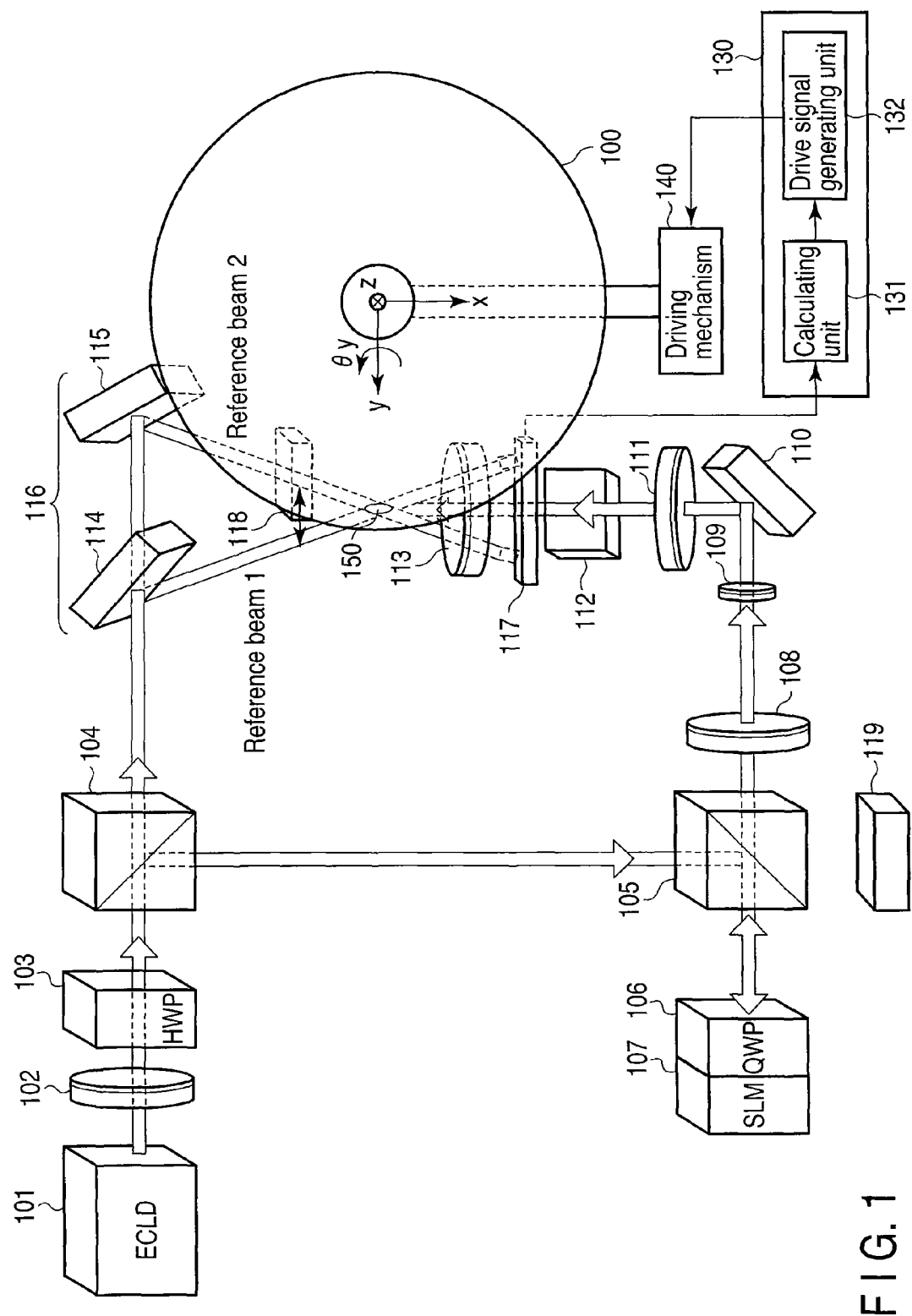
FIG. 1 is a diagram schematically showing a holographic recording/reproducing apparatus according to the embodiment, illustrating the paths of light beams when page data is recorded.

FIG. 1 schematically shows a holographic recording/reproducing apparatus according to an embodiment. More specifically, FIG. 1 shows one of the optical systems provided in the holographic recording/reproducing apparatus, which is utilized to record data (page data) on a data recording medium 100. As shown in FIG. 1, the holographic recording/reproducing apparatus includes a holographic storage medium corresponding to the data recording medium 100. The data recording medium 100 is formed of, for example, a circular disk. The data recording medium 100 is movably and rotatably supported by a driving mechanism 140. As one example, the data recording medium 100 can be moved in three axes and can be rotated around y-axis shown in FIG. 1. Address data indicating an absolute position (i.e., address) on the data recording medium 100 is recorded on the data recording medium 100 in the form of an address mark string 150. Shown in FIG. 1 is an example that the one address mark string 150 is recorded (or formed) on the data recording medium 100. In practice, a plurality of address mark strings can be arranged at predefined parts of the data recording medium 100.

The holographic recording/reproducing apparatus shown in FIG. 1 includes a light source 101 generating a light beam such as a laser beam. The light beam generated by the light source 101 is directed to a collimator lens 102. In the present embodiment, the light source 101 is an external cavity laser diode (ECLD) that generates a laser beam by using a semiconductor laser in combination with an external resonator. Therefore, the laser beam being generated by the light source 101 can be tunable in wavelength and intensity.

The light beam (laser beam) generated by the light source 101 is collimated by the collimator lens 102. The collimated light beam passes through a δ/2 plate (also referred to as a half-wave plate [HWP]) 103, and then is directed to a polarizing beam splitter 104. The δ/2 plate 103 changes the polarization direction of the light beam. The polarizing beam splitter 104 splits the incident light beam into two branch light beams, i.e., a signal beam and a reference beam. Specifically, the S-polarized component of the light beam passing through the δ/2 plate 103 is reflected by the reflection plane of the polarizing beam splitter 104 and directed to a polarizing beam splitter 105 as the signal beam. On the other hand, the P-polarized component of the light beam passes through the polarizing beam splitter 104 and is directed to a half-mirror 114 as the reference beam.

The signal beam from the polarizing beam splitter 104 is reflected by the reflection plane of the polarizing beam splitter 105 and directed to a δ/4 plate (also known as a quarter-wave plate [QWP]) 106. The reflected signal beam passes through the δ/4 plate 106, and then enter a spatial light modulator (SLM) 107. The spatial light modulator 107 modulates the incident signal beam and reflects the same back to the δ/4 plate 106. The modulated signal beam passes through the δ/4 plate 106 and is directed to the polarizing beam splitter 105. The modulated signal beam passing through the δ/4 plate 106 change to a light beam polarized by 90 degrees with respect to the signal beam previously entering the polarizing beam splitter 105. Therefore, the modulated signal beam passes through the polarizing beam splitter 105.

After passing through the polarizing beam splitter 105, the modulated signal beam is guided to an objective lens 113 through a lens 108, an aperture 109, a mirror 110, a lens 111 and a mirror 112. The lens 108 converges the modulated signal beam passing through the polarizing beam splitter 105. The aperture 109 controls the spot size of the modulated signal beam on the data recording medium 100 by limiting the size of the modulated signal beam, which is converged by the lens 108, at a position near the focal point thereof. After passing through the aperture 109, the modulated signal beam is reflected by the mirror 110 and directed to the lens 111. The lens 111 collimates the modulated signal beam, which is guided by the mirror 112 to the objective lens 113. The objective lens 113 focuses the modulated signal beam at the position, where data should be recorded, on the data recording medium 100.

In the meantime, the reference beam passing through the polarizing beam splitter 104 is further split into two branch light beams at a specific ratio by the half-mirror 114. One branch light beam is reflected by the half-mirror 114 and directed to the data recording medium 100 as first reference beam. The first reference beam is applied to the same position on the data recording medium 100 as the modulated signal beam is applied. The other branch light beam, which passes through the half-mirror 114, is reflected by a mirror 115 and directed to the data recording medium 100 as second reference beam. The second reference beam is applied to the same position on the data recording medium 100 as the modulated signal beam is applied. The half-mirror 114 and the mirror 115 cooperate to function as a light application unit 116 that generates two branch light beams from an incident light beam and guides the two branch light beams to the data recording medium 100. The first and second reference beams are applied at different angles to almost the same positions on the data recording medium 100 as the modulated signal beam is focused.

A shutter 118 is provided between the light application unit 116 and the data recording medium 100. The shutter 118 blocks either the first reference beam or the second reference beam when data (page data) is recorded or reproduced.

In the present embodiment, the address data recorded on the data recording medium 100 is reproduced by using both two branch light beams (i.e., first and second reference beam) generated by the light application unit 116. When page data is recorded on the data recording medium 100, a control unit 130 controls the data recording medium 100 in position in accordance with the address data so that the modulated signal beam and the first or second reference beam may be applied to the target position, at which page data should be recorded, in the data recording medium 100. Further, when page data is reproduced from the data recording medium 100, the control unit 130 controls the data recording medium 100 in position in accordance with the address data so that the first or second reference beam may be applied to the target position, at which page data to be reproduced is recorded, in the data recording medium 100.

To reproduce the address data, the first and second reference beams are simultaneously applied to the same address mark string 150 formed on the data recording medium 100, without utilizing the shutter 118. The address mark string 150 has a plurality of minute address marks spaced apart from each other by a predetermined distance. Each address mark is made of material that reflects a light beam at high reflectivity. The first and second reference beams applied to the address mark string 150 are therefore reflected, in part, by the address marks. The first and second reflected light beams from the address marks, which correspond to the reflected parts of the first and second reference beams, is directed to a photodetector 117. Each of the number of the first reflected light beams and the number of the first reflected light beams is equal to the number of address marks located in the irradiated region of the first and second reference beams. The first and second reflected light beams are detected by a photodetector 117. The photodetector 117 is an area sensor having light-receiving elements arranged in the form of a two-dimensional array, such as a CCD image sensor and a CMOS image sensor. The photodetector 117 detects the first and second reflected light beams to generate a detection signal. The detection signal is supplied, as image data, to the control unit 130.

In the control unit 130, the image data from the photodetector 117 is input to a calculating unit 131. The calculating unit 131 reproduces address data based on the image data received from the photodetector 117. The reproduced address data is sent to a drive signal generating unit 132. The drive signal generating unit 132 generates a drive signal based on the address data. The drive signal is supplied to the driving mechanism 140. The driving mechanism 140 changes the data recording medium 100 in position in accordance with the drive signal.

The holographic recording/reproducing apparatus shown in FIG. 1 further comprises another photodetector 119. This photodetector 119 is used to reproduce the page data recorded on the data recording medium 100. The photodetector 119 is an area sensor having light-receiving elements arranged in the form of a two-dimensional matrix, such as a CCD image sensor or a CMOS image sensor.

Next, the process of recording page data on the data recording medium 100 is explained.

As shown in FIG. 1, the light beam which is emitted by the light source 101 is collimated by the collimator lens 102. The collimated light beam passes through the δ/2 plate 103 and enter the polarizing beam splitter 104. The light beam passing through the δ/2 plate 103 is split into two branch light beams by the polarizing beam splitter 104. Specifically, the light beam is split into a P-polarized component and an S-polarized component. The P-polarized component passes through the polarizing beam splitter 104. The S-polarized component is reflected by the polarizing beam splitter 104.

The S-polarized component reflected by the polarizing beam splitter 104 is used as signal beam to record page data. The P-polarized component passing through the polarizing beam splitter 104 is used as reference beam to record page data. The amount ratio between the signal beam and the reference beam can be adjusted by changing the rotation angle of the δ/2 plate 103.

The signal beam reflected by the polarizing beam splitter 104 (i.e., light beam split downwards as shown in FIG. 1) is directed to the polarizing beam splitter 105. The signal beam reflected by the polarizing beam splitter 105 enters the spatial light modulator 107 through the δ/4 plate 106. The spatial light modulator 107 first modulates the signal beam with the page data and then reflects the signal beam so modulated. As one example, the spatial light modulator 107 is a reflection-type spatial light modulator that has a plurality pixels arranged in rows and columns. In this example, a processor (not shown) performs encoding on the user data to be recorded, thereby converting the user data to page data which is a two-dimensional image data. The page data is input to the spatial light modulator 107 and displayed thereon. The spatial light modulator 107 changes the travelling direction or polarization direction of the light beam for each pixel in accordance with the page data, thereby spatially modulating the signal beam. Thus, the user data to be recorded is imparted, as two-dimensional pattern, to the signal beam in the spatial light modulator 107.

The signal beam modulated by the spatial light modulator 107 is directed back to the polarizing beam splitter 105 through the δ/4 plate 106. The modulated signal beam which again passes through the δ/4 plate 106 has the polarization direction which is orthogonal to that of the signal beam previously entering the polarizing beam splitter 105. That is, the modulated signal beam changes to the light beam having the P-polarized component. As a result, the modulated signal beam passes through the polarizing beam splitter 105. After passing through the polarizing beam splitter 105, the modulated signal beam is converged by the lens 108 and enters the lens 111 through the aperture 109 arranged near its focal point and the mirror 110. The lens 111 collimates the modulated signal beam. The aperture 109 is an element configured to control the spot size of the modulated signal beam on the data recording medium 100. After passing through the lens 111, the modulated signal beam is reflected by the mirror 112, upwards and slantwise with respect to the perpendicular to the plane of FIG. 1. That is, the modulated signal beam is reflected toward the objective lens 113. The objective lens 113 focuses the modulated signal beam on the recording layer (shown in FIG. 5) of the data recording medium 100.

On the other hand, the reference beam passing through the polarizing beam splitter 104 is directed to the half-mirror 114. One branch of the reference beam is reflected by the half-mirror 114 and is directed to the data recording medium 100 as first reference beam. The remaining branch of the reference beam passes through the half-mirror 114 as second reference beam. The second reference beam passing through the half-mirror 114 is reflected toward the data recording medium 100 by the mirror 115. The shutter 118 blocks either the first reference beam or the second reference beam. One of the first and second reference beams, which is not blocked by the shutter 118, is applied to almost the same position in the data recording medium 100 as the signal beam is applied. Thus, when page data is recorded on the data recording medium 100, either the first reference beam or the second reference beam is blocked by the shutter 118. Hence, both the first reference beam and the modulated signal beam or both the second reference beam and the modulated signal beam are applied to the data recording medium 100 at the same time. The first or second reference beam is applied to the data recording medium 100 through light path different from the light path of the modulated signal beam. In FIG. 2, the first and second reference beams are shown, overlapping each other.

In the recording layer of the data recording medium 100, the modulated signal beam interferes with the first or second reference beam, thereby generating interference fringes. The refractive index of the recording layer changes depending on the interference fringes. As a result of the change in refractive index, the page data is recorded on the data recording medium 100.

In the holographic recording/reproducing apparatus shown in FIG. 1, the first and second reference beams can be guided to the data recording medium 100 along the individual light paths and applied to the data recording medium 100 at different angles, thereby to achieve multiple recording of page data at almost same position on the data recording medium 100. Further, the data recording medium 100 can be rotated around the y-axis shown in FIG. 1 (thus, performing θy rotation), thereby to accomplish angular multiplexing. Furthermore, the holographic recording/reproducing apparatus may perform the shift recording that page data is recorded at different positions by causing the data recording medium 100 to move in both the x-axis and the y-axis shown in FIG. 1. In this way, the page data is recorded at a target position on the data recording medium 100.

Next, the process of acquiring the address data from the data recording medium 100 is explained.

The laser beam generated from the light source 101 is directed to the collimator lens 102. The laser beam is, for example, a light beam having center frequency of 405 nm. As described above, the laser beam collimated by the collimator lens 102 enters the polarizing beam splitter 104 through the δ/2 plate 103. The polarizing beam splitter 104 splits the laser beam into two branch light beams. The P-polarized component of the laser beam passes through the polarizing beam splitter 104, and the S-polarized component thereof is reflected by the polarizing beam splitter 104. After passing through the polarizing beam splitter 104, the P-polarized component is used as reference beam to reproduce the address data. The S-polarized component reflected by the polarizing beam splitter 104 is not used to reproduce the address data.

After passing through the polarizing beam splitter 104, the reference beam is directed to the light application unit 116. The light application unit 116 splits the reference beam into two branch light beams, i.e., first and second reference beams. The first and second reference beams are applied to the data recording medium 100 at different angles and partially reflected by the address mark string 150 formed on the data recording medium 100. The first and second reflected light beams from the address mark string 150 come from the first and second reference beams, respectively. The first and second reflected light beams from the address mark string 150 are applied to the photodetector 117 arranged near the objective lens 113 as shown in FIG. 2.

The photodetector 117 receives the first and second reflected light beams from the address mark string 150, thereby acquiring address mark images. The image data indicating the address mark images is supplied to the calculating unit 131.

The calculating unit 131 receives the image data from the photodetector 117 and reproduces the address data based on the received image data. Thus, the address data reproduced by the calculating unit 131 is supplied to the drive signal generating unit 132. The drive signal generating unit 132 processes the address data. For example, in order to move the data recording medium 100 to an address (target address) different from the address (present address) indicated by the reproduced address data, the drive signal generating unit 132 generates a drive signal based on the difference between the present address and the target address and supplies the drive signal to the driving mechanism 140.

The driving mechanism 140 is physically connected to the data recording medium 100 to control the position of the data recording medium 100 so that light beams (such as first and second reference beams) may be applied to any desired position on the data recording medium 100. In accordance with the drive signal, the driving mechanism 140 positions the data recording medium 100 at the desired address position. If other address data is reproduced after the data recording medium 100 is so positioned, the operation described above is repeated. The process that the calculating unit 131 reproduces the address data based on the image data supplied from the photodetector 117 is explained later.

In the present embodiment, the light source 101 and the optical system, which cooperate to record and reproduce page data on and from the data recording medium 100, are used to reproduce the address data. The configuration of the holographic recording/reproducing apparatus is not limited to this. A light source and an optical system, both dedicated to the reproduction of address data, may be used. As described above, the light application unit 116 splits the light beam emitted from the light source 101 into two branch light beams, and applies these branch light beams to the data recording medium 100 at different angles. The configuration is not limited to this, either. Instead, two light sources (e.g., laser diodes) may be provided, and the light beams being generated from these light sources may be applied, at different angles, to almost the same positions on the data recording medium 100.

As described above, in order to acquire the address data, the shutter 118 blocks neither the first reference beam nor the second reference beam, that is, both reference beams are applied to the data recording medium 100 at the same time. Alternatively, the shutter 118 may block the first and second reference beams one after the other. If the shutter 118 blocks the first and second reference beams one after the other, the calculating unit 131 acquires the position data from the reflected images (address mark images) which each of the first and second reference beams forms on the photodetector 117, stores the position data in an internal memory (not shown), and the position data stored in the internal memory is used to reproduce the address data.

Next, the process that page data is reproduced from the data recording medium 100 is explained with reference to FIG. 3 and FIG. 4.

Figure 3:
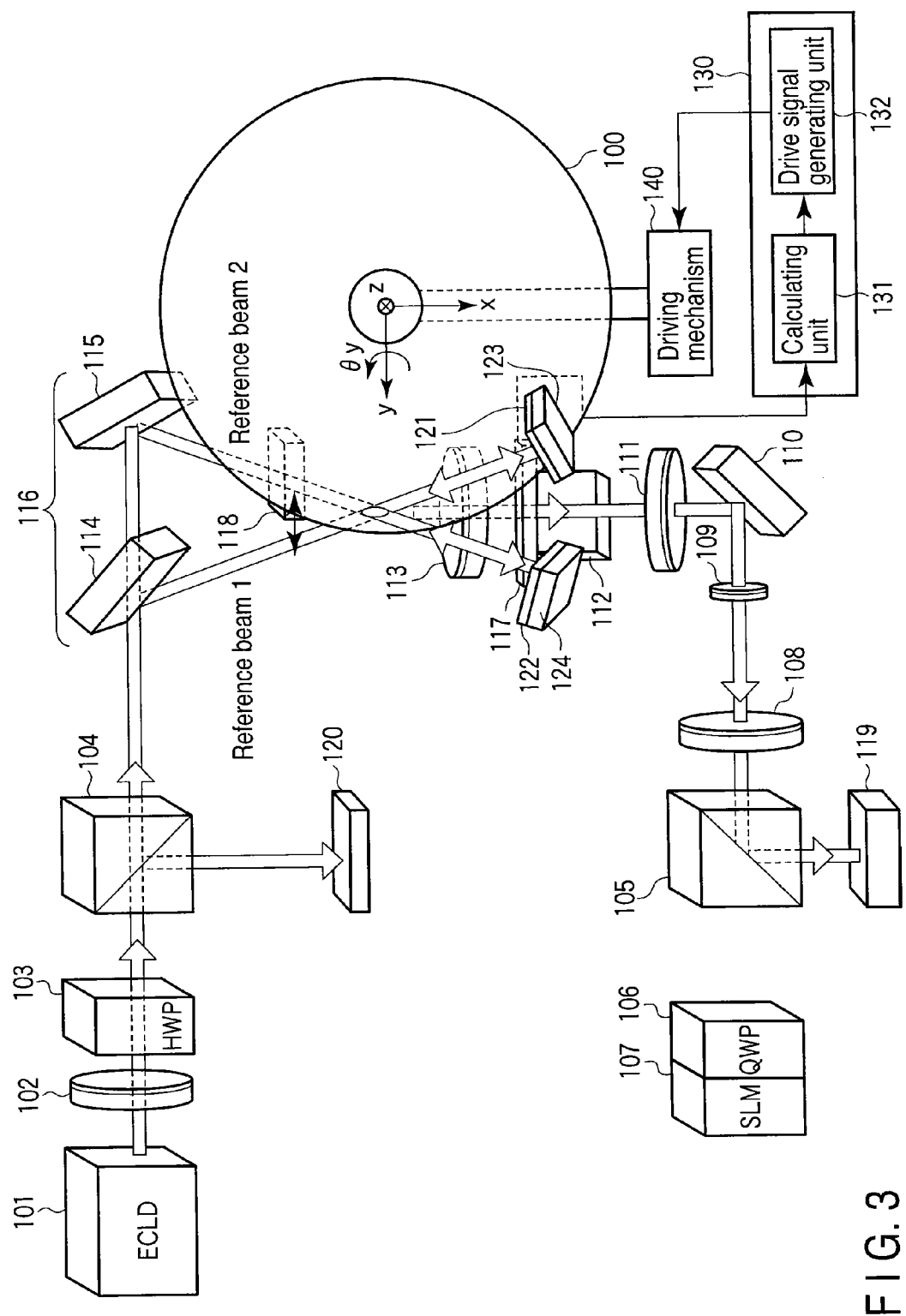
FIG. 3 is another diagram schematically showing a holographic recording/reproducing apparatus according to the embodiment, illustrating the paths of light beams when page data is reproduced.

FIG. 3 schematically shows the optical system, which is one of the various optical systems provided in the holographic recording/reproducing apparatus and which is used to reproduce page data from the data recording medium 100. FIG. 4 schematically shows the paths of light beams relevant to the data recording medium 100 shown in FIG. 3. The components identical to those shown in FIG. 1 and FIG. 2 are designated by the same reference numbers in FIG. 3 and FIG. 4, and duplication of explanation will be avoided.

The holographic recording/reproducing apparatus of FIG. 3 includes the photodetector 119, a shutter 120, a $\delta/4$ plate 121, a mirror 123 used for reproduction, a $\delta/4$ plate 122 and a mirror 124 used for reproduction, in addition to the components shown in FIG. 1. The shutter 120 blocks the signal beam reflected by the polarizing beam splitter 104. The photodetector 119 detects a reproduction light beam, which is described later, reflected by the polarizing beam splitter 105. The $\delta/4$ plate 121 and the mirror 123 are integrally formed, and are arranged to reflect the first reference beam passing through the data recording medium 100 and to guide the same back to the data recording medium 100 as shown in FIG. 4. Similarly, the $\delta/4$ plate 122 and the mirror 124 are integrally formed, and are arranged to reflect the second reference beam passing through the data recording medium 100 and guide the same back to the data recording medium 100.

As shown in FIG. 3, the laser beam emitted from the light source 101 is directed to the beam splitter 104. The beam splitter 104 splits the laser beam into two branch light beams, i.e., a reference beam and a signal beam. As the signal beam is not used to reproduce page data, the signal beam is blocked by the shutter 120.

The reference beam passing through the beam splitter 104 is split by the half-mirror 114 into first and second reference beams. As shown in FIG. 4, the first reference beam reflected by the half-mirror 114 passes through the data recording medium 100 and the $\delta/4$ plate 121 and is reflected by the mirror 123. The first reference beam reflected by the mirror 123 travels in the opposite direction and passes through the $\delta/4$ plate 121 again. The first reference beam is then applied at the target position, where the page data to be reproduced is recorded, on the data recording medium 100. Similarly, the second reference beam reflected by the mirror 115 passes through the data recording medium 100 and the $\delta/4$ plate 122 and is reflected by the mirror 124. Then, the second reference beam reflected by the mirror 124 travels in the opposite direction, passes through the $\delta/4$ plate 122 again and is applied to the target position, where the page data to be reproduced is recorded, on the data recording medium 100. When page data is reproduced, the shutter 118 blocks one of the first and second reference beams according to the page data to be reproduced. The first and second reference beams used to reproduce the address data travel in the same paths as is described with reference to FIG. 2.

The present embodiment is a holographic recording/reproducing apparatus of so-called "phase-conjugate reproduction system". As shown from FIG. 4, the reflected light beam from the mirror 123 or the mirror 124 is applied to the data recording medium 100. As a result, a signal beam based on the recorded page data is retrieved. This signal beam is referred as to the reproduction light beam. The reproduction light beam is directed to the objective lens 113. Specifically, a reference beam (the first reference beam or the second reference beam) is applied to the interference fringes formed on the data recording medium 100, and a diffraction image according to the interference fringes is produced as reproduction light beam.

The reproduction light beam passing through the objective lens 113 is reflected by the mirror 112 and guided in the direction opposite to the direction in which the modulated signal beam is guided. Specifically, the reproduction light beam passes the lens 111, mirror 110, aperture 109 and lens 108, as shown in FIG. 3. The reproduction light beam collimated by the lens 108 is reflected by the polarizing beam splitter 105 and then directed to the photodetector 119. The photodetector 119 receives the reproduction light beam retrieved from the data recording medium 100 to generate a page data image. The page data image is supplied to a processing unit (no shown). The processing unit reproduces page data based on the page data image.

When page data is reproduced, the shutter 118 blocks one of the first reference beam and second reference beam. On the data recording medium 100, the first or second reference beam is applied at the position where the page data to be read is recorded. Thus, the page data recorded by applying the first reference beam and the signal beam is reproduced if the first reference beam is applied to the data recording medium 100, and the page data recorded by applying the second reference beam and the signal beam is reproduced if the second reference beam is applied to the data recording medium 100.

As described above, the present embodiment can apply two light beams at different angles to almost the same positions on the data recording medium 100. Then, the light beams reflected by the address mark string 150 formed on the data recording medium 100 are detected, thereby acquiring the address data.

Figure 5:
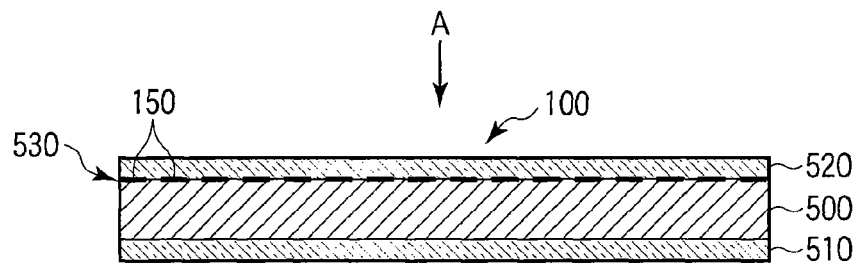
FIG. 5 is a sectional view schematically showing the data recording medium shown in FIG. 1.

FIG. 5 is a sectional view of the data recording medium 100 on which the address mark strings 150 are formed. As shown in FIG. 5, the data recording medium 100 is a laminated structure including a recording medium (also referred to as a recording layer) 500 on which page data is recorded, a transparent substrate 510, and a transparent substrate 520. The recording layer 500 is interposed between the transparent substrates 510 and 520. The recording layer 500 and the transparent substrates 510 and 520 are not limited in terms of thickness. As one example, each of the transparent substrates 510 and 520 has a thickness of 0.5 mm, and the recording layer 500 has a thickness of 1.5 mm. The planar shape of the data recording medium 100, which is viewed in the direction of arrow A shown in FIG. 5, is a circle having a diameter of, for example, 12 cm, as shown in FIG. 1.

At the boundary surface between the recording layer 500 and the transparent substrate 520, an address mark layer 530 is formed. On the address mark layer 530, address mark strings 150 are formed. Each of the address mark strings 150 has a plurality of address marks, each able to reflect a light beam.

The address mark layer 530 may be provided at the boundary surface between the transparent substrates 510 and the recording layer 500, or provided inside the recording layer 500. Alternatively, the address mark layer 530 may be provided on an outer surface of the data recording medium 100. That is, the address mark layer 530 may be provided on the outer surface of the transparent substrate 510 or on the outer surface of the transparent substrate 520. In either case, the same advantage can be achieved.

Moreover, the planar shape of the data recording medium 100 is not limited to a circular form. The data recording medium 100 can have any other planar shape such as square, rectangle, ellipse or polygon.

Figure 6:
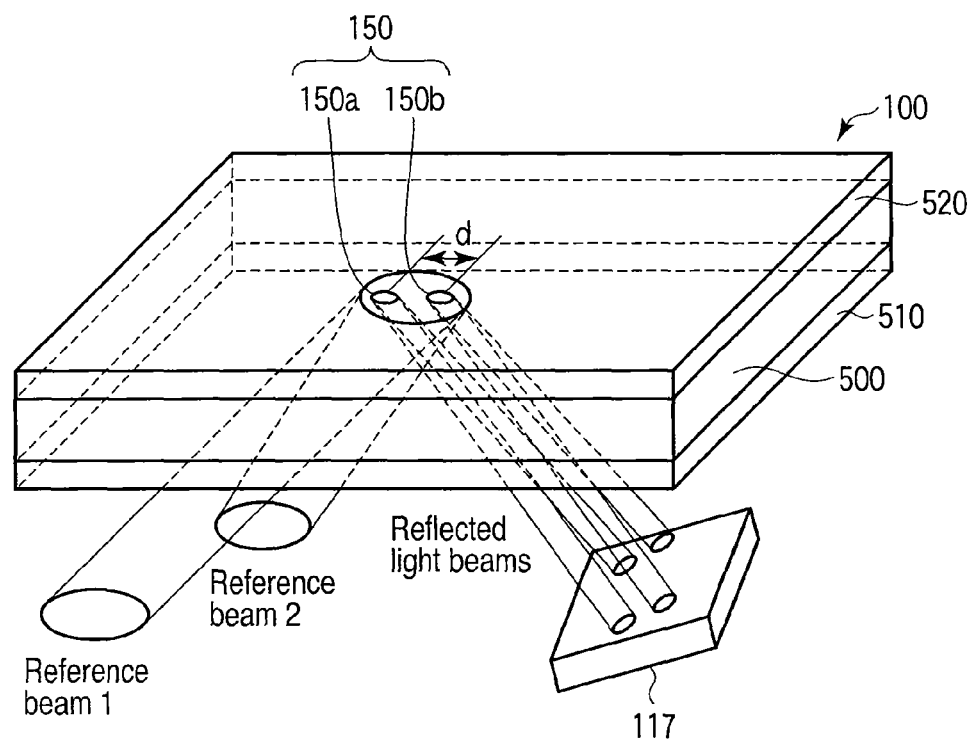
FIG. 6 is a diagram schematically showing the path of reflected light beams from the address mark string shown in FIG. 5.

FIG. 6 schematically shows the paths of light beams reflected by the address mark string 150 formed on the data recording medium 100. As shown in FIG. 6, the first and second reference beams are applied to the outer surface of the lower transparent substrate 510, pass through the recording layer 500 and are applied to almost same positions on the address mark layer 530. The first and second reference beams are reflected by the address marks 150a and 150b included in the address mark string 150 formed on the address mark layer 530. The first and second reflected light beams from the address marks 150a and 150b pass first through the recording layer 500 and then through the transparent substrate 510, and enter the sensor surface of the photodetector 117.

The address marks 150a and 150b are minute marks made of high-reflectivity material that reflects a light beam at a reflectivity of, for example, 80% or more. As one example, the address marks 150a and 150b are thin films made of aluminum or silver-alloy. On the address mark layer 530, the address mark string 150 including such address marks 150a and 150b is formed. In the address mark string 150, the address marks 150a and 150b are spaced by a predefined distance. The address mark string 150 has address data depending on the arrangement of the address marks 150a and 150b.

As shown in FIG. 6, the address marks 150a and 150b, which are circular dots, are spaced by a particular distance d. The address marks 150a and 150b have a diameter of, for example, 50 μm. Distance d is, for example, 0.5 mm. The first and second reference beams have almost the same diameter, and illuminate both address marks 150a and 150b in the address mark layer 530. When the first and second reference beams illuminate the address marks 150a and 150b at the same time, four reflected beams are applied to the sensor surface of the photodetector 117. Two reflected light beams of the four reflected light beams result from the reflection of the first reference beam. These reflected light beams are referred to as first reflected beams. The other two reflected light beams result from the reflection of the second reference beam. These reflected light beams are referred to as second reflected beams.

Next, the process of generating address data based on the image data acquired from the light beams reflected by the address mark string 150 formed on the data recording medium 100 is explained in detail.

Figure 7:
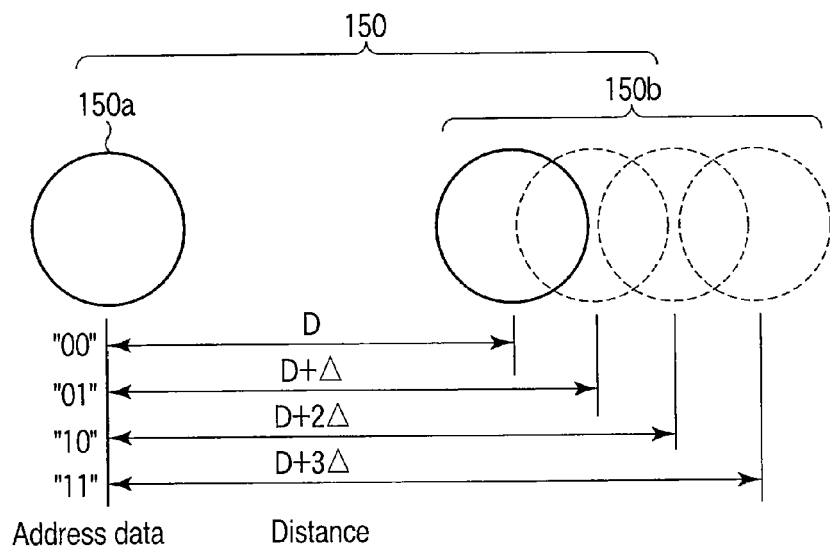
FIG. 7 is a diagram showing an example that address data allocated to the address mark string shown in FIG. 5.

FIG. 7 shows an example of the method that address data is allocated to the address mark string 150. In the example of FIG. 7, 2-bit address data is allocated to the address mark string 150 having two address marks 150a and 150b. The address data is imparted to the distance d between the center of the address mark 150a and the center of the address mark 150b. That is, the distance d between the centers of the address mark 150a and 150b is determined according to the imparted address data. As one example, if the two address marks 150a and 150b are spaced by distance D, "00" is allocated to the address mark string 150. In other words, the address mark string in which two address marks 150a and 150b are spaced by distance D has address data "00". In the present embodiment, the address data is incremented as the distance d increases by predetermined value Δ on the basis of distance D. That is, an address mark string having two address marks 150a and 150b spaced by distance D+Δ (d=D+Δ) has address data "01". An address mark string having two address marks 150a and 150b spaced by distance D+2×Δ (d=D+2×Δ) has address data "10". An address mark string having two address marks 150a and 150b spaced by distance D+3×Δ (d=D+3×Δ) has address data "11".

The address data is allocated to the address mark string 150 in accordance with the distance between the address marks therein. Hence, the address data can be acquired by detecting the reflected light beams from the address mark string 150 and measuring the distance d between the address marks.

It should be noted that the address data is not limited to 2-bit data and the address data may be three or more bit data. As one example, 4-bit address data can be allocated to the address mark string. In this case, the distanced d between the address marks is set to one of 16 predetermined values. For another example, 10-bit address data may be allocated to the address mark string by setting the distanced d between the address marks to one of 1024 predetermined values.

Further, the address data may include not only the data identifying an absolute position (address) on the data recording medium 100 but also any other data. In cases where the address data is 10-bit data, for example, the 6-bit sequence of the address data can be used as address data, and the remaining 4-bit sequence can be used as parity data for error correction.

Figure 8:
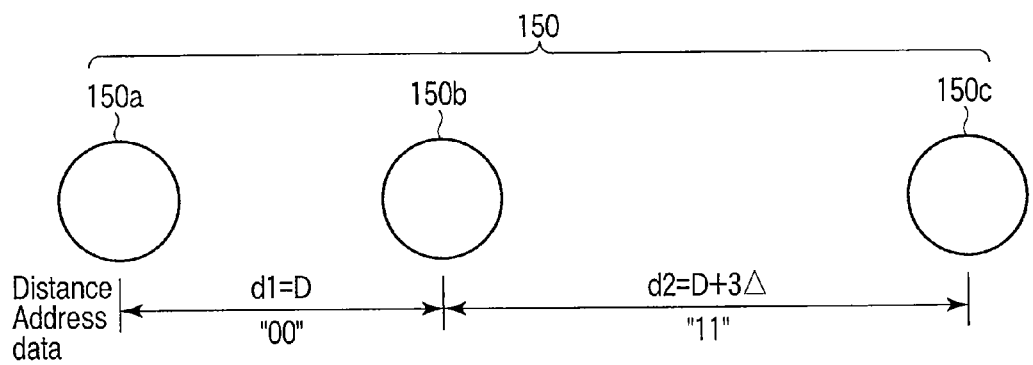
FIG. 8 is a diagram showing another example that address data allocated to the address mark string shown in FIG. 5.

In FIG. 7, shown is an example that the address data is allocated to an address mark string 150 having two address marks 150*a* and 150*b*. Nonetheless, the method of allocating address data is not limited to this example. Address data may be allocated to an address mark having three or more address marks. FIG. 8 shows an example in which address data allocated to three address marks 150*a*, 150*b* and 150*c*. In this example, address data is imparted to distance d1 between the centers of address marks 150*a* and 150*b*, and address data is imparted to distance d2 between the centers of address marks 150*b* and 150*c*. Specifically, two 2-bit address data items are imparted to distances d1 and d2, respectively, by the method shown in FIG. 7. Hence, the address mark string 150 can have 4-bit address data. In FIG. 8, d1=D and d2=D+3×Δ. Therefore, the address mark string 150 has address data "0011".

If the address mark string 150 has three or more address marks as in this case, three or more bit address data can be allocated to the address mark string 150. In this case, the first and second reflected light beams from the address mark string 150 can be detected, and distances d1 and d2 can then be measured, thereby to acquire the address data.

Even if the address mark string 150 has three or more address marks, for example, address marks 150*a*, 150*b* and 150*c*, the number of bits of the address data imparted to distances d1 and d2, respectively, is not limited to 2, and the address data may be three or more bit data.

In an example that the address mark has three or more address marks, the address marks can be arranged in the form of a two-dimensional array. FIG. 9 shows exemplary address data allocated to an address mark string that has address marks 150*a*, 150*b* and 150*c* arranged in the form of a two-dimensional array. As shown in FIG. 9, address marks 150*b* and 150*c* are spaced apart in the plane of the address mark layer 530 in different directions as viewed from address mark 150*a*. In this case, the address data is imparted distance d1 between the centers of the address marks 150*a* and 150*b*, and also to the distance d3 between the centers of the address marks 150*a* and 150*c*. Two 2-bit address data items are imparted to distances d1 and d3, respectively, for example, by the method shown in FIG. 7. As a result, the address mark string 150 can have 4-bit address data. In FIG. 9, since d1=D and d3=D+3×Δ, the address mark string 150 has address data "0011".

In this manner, the address mark 150 has address data according with the arrangement of address marks. Hence, the address data can be acquired by detecting the first and second reflected light beams from the address mark 150 and measuring two distances d1 and d3.

Even if the address mark string 150 has three or more address marks, e.g., address marks 150*a*, 150*b* and 150*c* and these address marks are arranged in the form of a two-dimensional array and in the plane of the address mark layer 530, the address data items imparted to distances d1 and d2 are not limited to two bit data. Rather, the address data items may be three or more bit data.

In FIG. 9, the address marks 150*a*, 150*b* and 150*c* are so arranged that the first vector connecting the address marks 150*a* and 150*b* is at about 90° to the second vector connecting the address marks 150*a* and 150*c*. The arrangement of the address marks is not limited to this, nevertheless. For example, the address marks 150*a*, 150*b* and 150*c* may be so arranged such that the angle formed by the first vector and the second vector is 45°, 60°, or the like.

FIG. 10 schematically shows the address mark images acquired by the photodetector 117. FIG. 10 show the case where the first and second reference beams each illuminate two address marks 150*a* and 150*b*. In FIG. 10, the address mark images 910*a* and 910*b* correspond to reflected images of the address marks 150*a* and 150*b*, respectively, which are formed by the first reference beam. Similarly, the address mark images 920*a* and 920*b* correspond to reflected images of the address marks 150*a* and 150*b*, respectively, which are formed by the second reference beam. The photodetector 117 detects the two address marks 150*a* and 150*b* formed on the data recording medium 100, as four address mark images 910*a*, 910*b*, 920*a* and 920*b*. The calculating unit 131 detects the distance e1 between the centers of the address mark images 910*a* and 910*b* and the distance e2 between the centers of the address mark images 920*a* and 920*b*. Thus, two distances e1 and e2 are detected from the image data acquired by the photodetector 117, for two address marks 150*a* and 150*b* that should be measured.

Specifically, the calculating unit 131 first calculates two distances e1 and e2 from the image data output from the photodetector 117, and then calculates the average value $e_{ave}$ of these distances e1 and e2, as measurement result e, as indicated by the following equation (1):

$$e_{ave} = \frac{e_1 + e_2}{2} \qquad (1)$$

The measurement result e calculated by the calculating unit 131 is not always equal to the distance d between the address marks 150*a* and 150*b* formed on the data recording medium 100 in theory. The measurement result e changes depending on the relative angle between the sensor surface of the photodetector 117 and the address mark layer 530 of the data recording medium 100. The relation between the distance d and the measurement result e is expressed by the following equation (2):

$$d = k \times e \qquad (2)$$

where k is a conversion coefficient. The conversion coefficient k depends on the relative angle between the sensor surface of the photodetector 117 and the address mark layer 530 of the data recording medium 100.

Next, the calculating unit 131 calculates the distance d between the address marks 150*a* and 150*b* by applying the equation (2) to the measurement result e. The calculating unit 131 acquires the address data possessed by the address mark string 150 based on the calculated distance d. The calculating unit 131 determines to which value the calculated distance d is most close, D, D+Δ, D+2×Δ or D+3×Δ. If the calculated distance d is most close to D, the calculating unit 131 outputs address data "00". If the calculated distance d is most close to D+Δ, the calculating unit 131 outputs address data "01". If the calculated distance d is most close to D+2×Δ, the calculating unit 131 outputs address data "10". If the calculated distance d is most close to D+3×Δ, the calculating unit 131 outputs address data "11".

The calculating unit 131 may derive the measurement result e from distances e1 and e2, not by calculating the simple average as described above, but by performing any other mathematical operation. For example, the calculating unit 131 may calculate a weighted average $e_{wa}$ as defined by the following equation (3) or a root square sum $e_{rss}$ as defined by the following equation (4).

$$e_{wa} = \frac{(\alpha \times e_1 + \beta \times e_2)}{2} \qquad (3)$$

where α+β=1.

$$e_{rss} = \sqrt{e_1^2 + e_2^2} \qquad (4)$$

As described above, the relation the distance d between the address marks 150a and 150b with the distances e1 and e2 between the address mark images depends on the relative angle between the sensor surface of the photodetector 117 and the address mark layer 530 of the data recording medium 100. Therefore, it is desired that the sensor surface of the photodetector 117 should remain at a particular angle to the data recording medium 100.

The inventors hereof measured the distance between the address marks 900 times using two laser beams as in the present embodiment. Further, the inventors measured the distance between the address marks 900 times using one laser beam, for comparison. The standard deviation (or data spread) of the measured distance was calculated for either case. The results are shown in Table 1 set forth below. Note that the distance d between the address marks were set to 1.0 mm, and that the result obtained by using two laser beams is the average distance calculated in accordance with the equation (1).

TABLE 1

|  | Standard deviation (μm) |
| --- | --- |
| One beam applied | 2.65 |
| Two beams applied | 1.86 |

As show in Table 1, the standard deviation of the measured distances is smaller when two light beams is used than when one light beam is used. That is, the distance can be more accurately measured when two light beams are applied than when one light beam is applied.

As described above, the data recording/reproducing apparatus according to the embodiment applies two light beams to the address mark string formed on the data recording medium at different angles, detects the first and second reflected light beams from the address mark string to image data, and calculates the distance between the address marks of the address mark string based on the image data. Therefore, the data reproducing apparatus can reproduce, at high accuracy, the address data possessed by the address mark string.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data reproducing apparatus comprising:
a data recording medium on which an address mark string including address marks is formed, the address marks being spaced from each other by a distance depending on address data indicating an absolute position on the data recording medium;
a light source unit configured to generate a light beam;
a light application unit configured to split the light beam into a first branch light beam and a second branch light beam and apply the first branch light beam and the second branch light beam to the address mark string at different angles;
a photodetector unit configured to detect a plurality of first reflected light beams and a plurality of second reflected light beams from the address mark string to generate image data;
the first reflected light beams and the second reflected light beams resulting from the first branch light beam and the second branch light beam, respectively; and
a control unit configured to reproduce address data based on the image data, wherein the photodetector unit generates, as the image data, a plurality of first address mark images and a plurality of second address mark images acquired from the first reflected light beams and the second reflected light beams, respectively, and
the control unit detects one or more first distances between the first address mark images and one or more second distances between the second address mark images, calculates one or more third distances between the address marks based on the first distances and the second distances, and reproduces the address data based on the third distances.

2. The apparatus according to claim 1, wherein the control unit calculates average values of the first distances and the second distances as the third distances.

3. The apparatus according to claim 1, wherein the first branch light beam and the second branch light beam are used to record page data on the data recording medium and to reproduce page data from the data recording medium.

4. The apparatus according to claim 3, wherein the data recording medium is a holographic storage medium.

* * * * *